(12) United States Patent
Schlagel

(10) Patent No.: US 7,243,782 B2
(45) Date of Patent: Jul. 17, 2007

(54) CONVEYOR

(75) Inventor: William A. Schlagel, Coon Rapids, MN (US)

(73) Assignee: Schlagel, Inc., Cambridge, MN (US)

( * ) Notice: Subject to any disclaimer, the term of this patent is extended or adjusted under 35 U.S.C. 154(b) by 0 days.

(21) Appl. No.: 11/047,353

(22) Filed: Jan. 31, 2005

(65) Prior Publication Data

US 2005/0189201 A1 Sep. 1, 2005

Related U.S. Application Data

(60) Provisional application No. 60/540,459, filed on Jan. 30, 2004.

(51) Int. Cl.
*B65G 23/44* (2006.01)
*B65G 21/00* (2006.01)

(52) U.S. Cl. .................................. 198/816; 198/860.3
(58) Field of Classification Search ............... 198/816, 198/813, 860.3
See application file for complete search history.

(56) References Cited

U.S. PATENT DOCUMENTS

| 2,808,924 | A | * | 10/1957 | Wood ......................... 198/816 |
| 2,939,571 | A | * | 6/1960 | Evans ......................... 198/816 |
| 3,018,875 | A | * | 1/1962 | Greenberger ................ 198/816 |
| 3,752,298 | A | * | 8/1973 | Wenger ....................... 198/816 |
| 3,832,910 | A | * | 9/1974 | Bryant ........................ 474/136 |
| 3,921,793 | A | * | 11/1975 | Hutchinson et al. ......... 198/813 |
| 3,978,977 | A | * | 9/1976 | Michelbrink et al. ....... 198/816 |
| 4,230,222 | A |   | 10/1980 | Clark |
| 4,544,061 | A |   | 10/1985 | Crandall |
| 5,054,608 | A | * | 10/1991 | Bryant ........................ 198/816 |
| 5,067,608 | A |   | 11/1991 | McLellan |
| 5,947,263 | A | * | 9/1999 | Uber et al. .................. 198/813 |
| 6,044,965 | A |   | 4/2000 | Clark |
| 6,102,195 | A |   | 8/2000 | Weikel |
| 6,273,244 | B1 |   | 8/2001 | Dingeldein et al. |
| 6,405,855 | B1 |   | 6/2002 | Peltier et al. |
| 6,478,161 | B2 | * | 11/2002 | Howell ....................... 209/219 |
| 6,516,941 | B1 |   | 2/2003 | Buhne |
| 6,575,292 | B2 |   | 6/2003 | Swinderman |
| 6,601,692 | B2 |   | 8/2003 | Schaefer et al. |
| 2003/0183493 | A1 |   | 10/2003 | Ertel et al. |

OTHER PUBLICATIONS

Hi RolleR, *Models 18 through 54*, pp. 1-7, Undated.
Hi RolleR, *Application Design Manual*, Oct. 19, 2001, pp. 1-17.
Website Printout, *Roller Belt Conveyor Specifications*, pp. 1-2, Undated.
InterSystems, IS RollerFLO brochure, pp. 1-6, Undated.

* cited by examiner

*Primary Examiner*—Mark A. Deuble
(74) *Attorney, Agent, or Firm*—Patterson, Thuente, Skaar & Christensen, P.A.

(57) ABSTRACT

An enclosed belt conveyor having a high strength take-up section that maintains proper belt alignment with the use of just two take-up screws, while still allowing for the take up section housing to be made of lighter weight, less expensive materials. The take-up section of the present invention can be installed at a head section or tail section of an enclosed belt conveyor. The take-up section of the present invention generally includes two support arms slidably mounted in guides that maintain the support arms in a straight orientation and two take-up screws that adjust the support arms within the guides while maintaining proper alignment of the take-up section without the necessity of separate leveling screws.

21 Claims, 6 Drawing Sheets

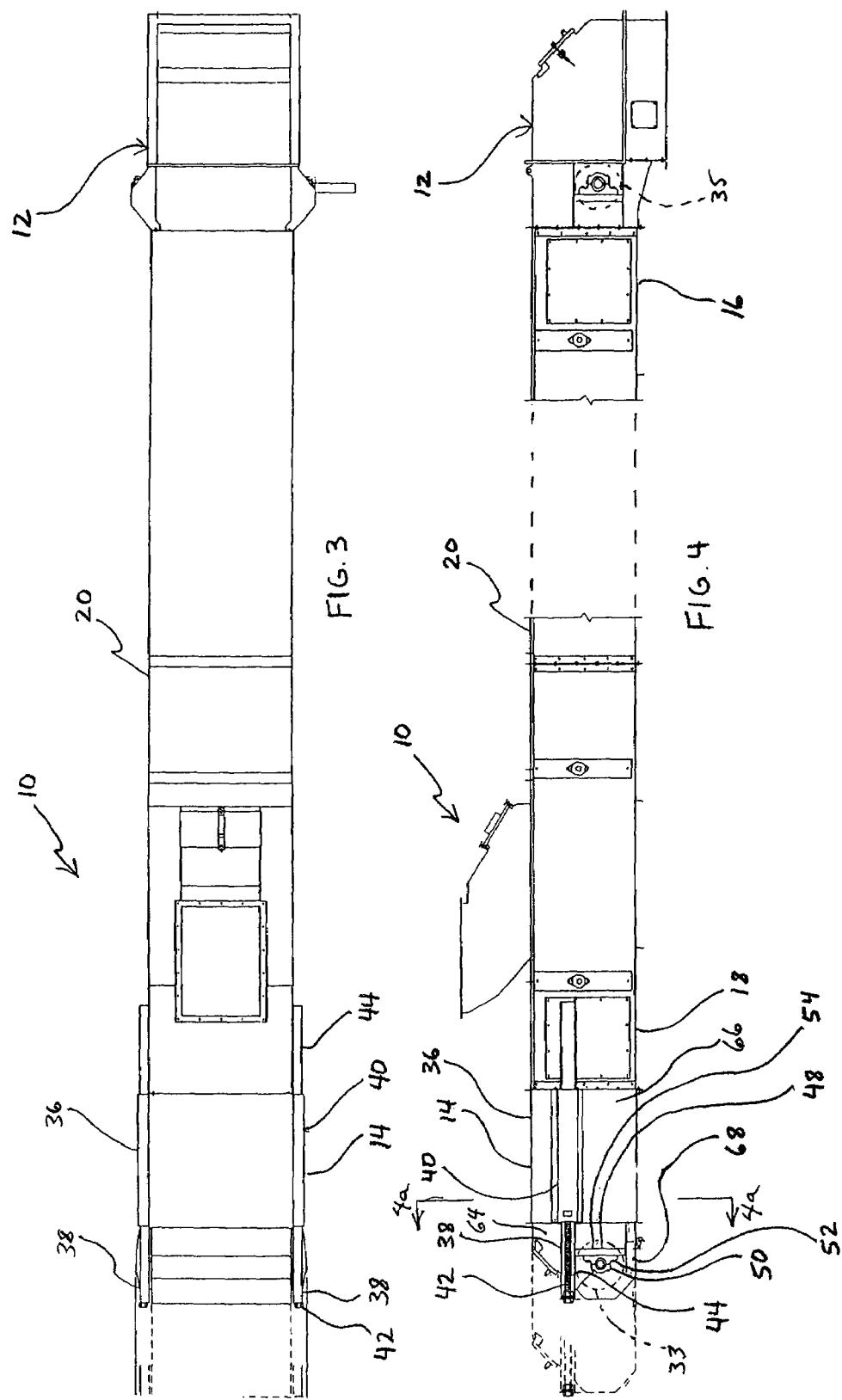

CONVEYOR

This application claims priority to U.S. Provisional Patent Application Ser. No. 60/540,459, filed Jan. 30, 2004. Said application and the appendix attached thereto are incorporated by reference herein.

FIELD OF THE INVENTION

The present invention relates to belt conveyors. More particularly, the present invention relates to tensioners located at the end of belt conveyors that are used for with spool shaped rollers to convey grain and other granular materials.

BACKGROUND OF THE INVENTION

Referring to FIGS. 1 and 2, enclosed belt conveyors 1 are utilized for the safe, gentle and efficient handling of dry bulk granular materials. Totally enclosed belt conveyors have the advantage of containing dust and spilled materials and automatically reloading spilled material back onto the belt. In addition, they protect conveyed materials from contamination and degradation from environmental factors. Enclosed belt conveyors often incorporate a plurality of spool shaped idler rollers 24 to provide a trough shaped support for the conveyor belt 22. The use of spool shaped idler rollers provides a contoured support for the continuous belt which carries granular materials 31.

Enclosed belt conveyors typically include a head section 12, a tail section 14 and a number of sections intermediate between the head section and the tail section. Typically, the motor and drive mountings are located at or near the head or discharge end of the conveyor. A tail (or non-drive end) section is located at the inlet end of the conveyor. In addition, any number of intermediate sections may be placed between the head section and the tail section to create a complete conveyor assembly. An endless belt runs from the tail section to the head section, and loops around a pulley and a shaft at each end. Enclosed belts conveyors may be several hundred feet long. Consequently, the endless belts will be approximately double the length of the conveyor assembly.

All belts stretch over time. The belts used in enclosed belt conveyors tend to stretch more dramatically during their initial break-in period. However, belts continue to stretch throughout their life. One way to compensate for belt stretch, in an otherwise still usable belt, is to cut out a section of the belt and to resplice the cut ends together thus shortening the belt. Shortening a belt by splicing is a time consuming and labor-intensive process that requires that the conveyor be inoperative while the splicing is performed. It is not uncommon for a long belt to stretch several feet during its life. Therefore, it is necessary to provide for adjustment in the conveyor assembly to take up the slack that develops in a belt as it stretches and also to provide adjustment when the belt is shortened.

Although a take-up may consist of a simple movable bearing mount for the shaft and pulley it is complicated in this instance by the requirement to maintain a fully enclosed conveyor structure.

Referring to FIG. 1, a typical prior art belt tensioner used with an enclosed belt conveyor includes an inner sleeve attached to the tail end of the conveyor and an outer sleeve that is part of a tail end section of the conveyor. The inner sleeve 5 telescopes into the outer sleeve 6 and is supported by the outer sleeve. The tensioner further includes four long bolts, threaded rods or screws. Two of these long bolts are typically referred to as tail take-up screws 2 and the other two as leveling screws 4. The tail take-up screws are located on the centerline of the tail shaft bearings 7. The tail take-up screws 2 are tightened equally to tension the belt and to compensate for belt stretch. The tail take-up screws 2 must be tightened equally to prevent misalignment of the pulleys that cause belt-tracking problems. The tail section leveling screws 4 are typically located above the centerline of the tail shaft bearings. The leveling screws 4 are used to level the tail section to compensate for misalignment that occurs when the tail take-up screws 2 are adjusted to properly tension the belt and to compensate for belt stretch. The leveling screws 4 are not used for tightening the belt. The above described arrangement is typically referred to as a sliding box tail. A take-up section may also be located at the head end of the conveyor if desired or rarely at an intermediate location.

Other prior art conveyors utilize take-up sections with sliding bearing mounts and take-up screws. In this arrangement, the bearings for the end roller in the head or tail section are mounted in a plate that is slidably mounted to the conveyor housing. A screw mechanism is used to slide the plate axially related to the longitudinal axis of the conveyor to tension and compensate for slack in the belt. The length of the section in which it is located limits the adjustment distance available in a sliding bearing mount arrangement.

All of these prior art take-up sections have the disadvantage that the weight and tension of the conveyor belt and its contents are born by the housing of the take-up section. Therefore, the take-up section housing must be very robustly constructed to resist the tension of the belt, the weight of the housing, shaft, pulleys and bearings in addition to the tension of the belt which may be thousands of pounds. Heavy housing components are costly. Further, take-up sections that utilize both take-up screws and leveling screws require the proper adjustment of at least four bolts in order to properly adjust and position the take-up section. If these adjustments are improperly made, the belt will track improperly, wear excessively and have a shortened life. Thus, it would be a benefit to the enclosed belt conveyor industry if belt tensioning could be accomplished without the need for both take-up screws and leveling screws and if take-up sections could be constructed of lighter weight materials.

SUMMARY OF THE INVENTION

The present invention solves most of the above problems by providing an enclosed belt conveyor having a high strength take-up section that maintains proper belt alignment with the use of just two take-up screws, while still allowing for the take-up section housing to be made of lighter weight, less expensive materials. The take-up section of the present invention can be installed at a head section or tail section of an enclosed belt conveyor. The take-up section of the present invention generally includes two support arms slidably mounted in guides that maintain the support arms in a straight orientation and two take-up screws that adjust the support arms within the guides while maintaining proper alignment of the take-up section without the necessity of separate leveling screws.

The take-up section of the present invention is conveniently installed in the tail section of an enclosed belt conveyor. However, the take-up section may be located in the head of the enclosed belt conveyor. The take-up section of the present invention generally includes two support arms, advantageously constructed from channel, that ride within two longitudinal guides. Desirably, the take-up screws of the present invention are located inside the take-up arms and are connected to the guides.

The support arms are slidingly supported within the guides, desirably on ultra high molecular weight polyethylene bearing blocks. The support arms of the present invention support a bearing mount. The bearing mount typically extends perpendicular to the longitudinal axis of each support arm. The bearing support, in turn, carries bearings that support the tail pulley of an enclosed belt conveyor. The bearings are desirably in the form of pillow blocks.

BRIEF DESCRIPTION OF THE DRAWINGS

FIG. 3 is top plan view of the enclosed belt conveyor of the present invention;
FIG. 4 is a side plan view of the enclosed belt conveyor of the present invention.

DETAILED DESCRIPTION OF THE INVENTION

Figure 1:
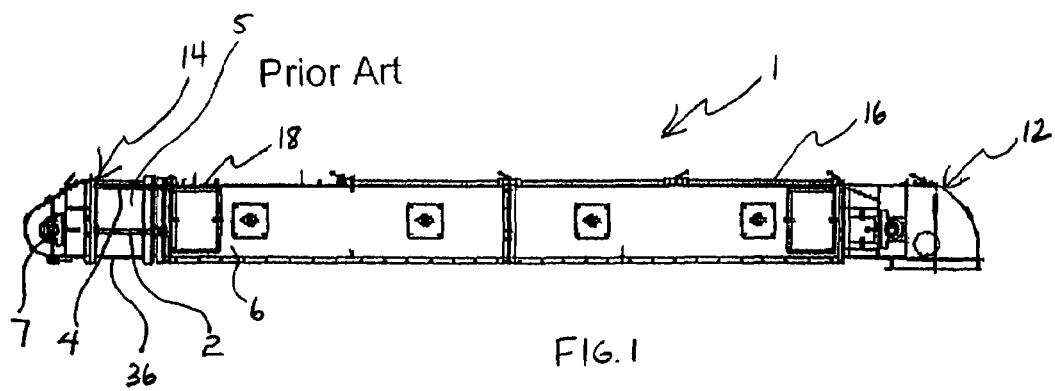
FIG. 1 is a side plan view of a prior art enclosed belt conveyor.

Referring to FIGS. 3–8, an enclosed belt conveyor 10 generally includes head section 12, tail section 14, head section 16, tail section 18 and may include a plurality of intermediate sections 20. The head section 12 is the end of the enclosed belt conveyor at which conveyed materials are discharged. The tail section 14 is the end of the enclosed belt conveyor 10 at which conveyed material is deposited on the belt for transport.

Figure 2:
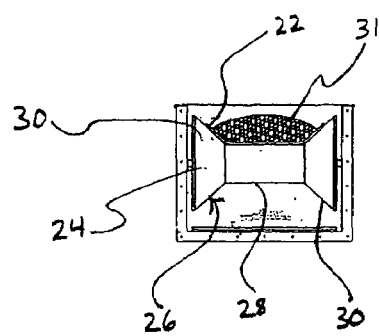
FIG. 2 is a sectional view of an enclosed belt conveyor.

Enclosed belt conveyor 10 generally includes a conveyor belt 22 supported by a plurality of rollers 24 essentially as is illustrated in Prior Art FIG. 2. An exemplary spool roller 26 generally includes a central body 28 and two flanges 30. Body 28 and flanges 30 together create a trough shaped depression in which conveyor belt 22 is supported. Thus, spool rollers 26 create a trough for supporting granular material 31 on conveyor belt 22. The trough can also be created by the use of a horizontal cylindrical roller and a pair of angled cylindrical rollers to support the edges of the belt, a rollerless sliding form or a slide bed conveyor as is known in the art.

Enclosed belt conveyor 10 also includes a head pulley 35 shown in phantom by dashed lines, located in head section 12 and a tail pulley 33, also shown by dashed lines in phantom, located in tail section 14. Head pulley and tail pulley support belt 22 where it reverses direction at each end of enclosed belt conveyor 10.

Referring to FIGS. 3 and 4, take-up section 36, in accordance with the present invention, generally includes support arms 38, guides 40 and take-up screws 42.

Figure 5:
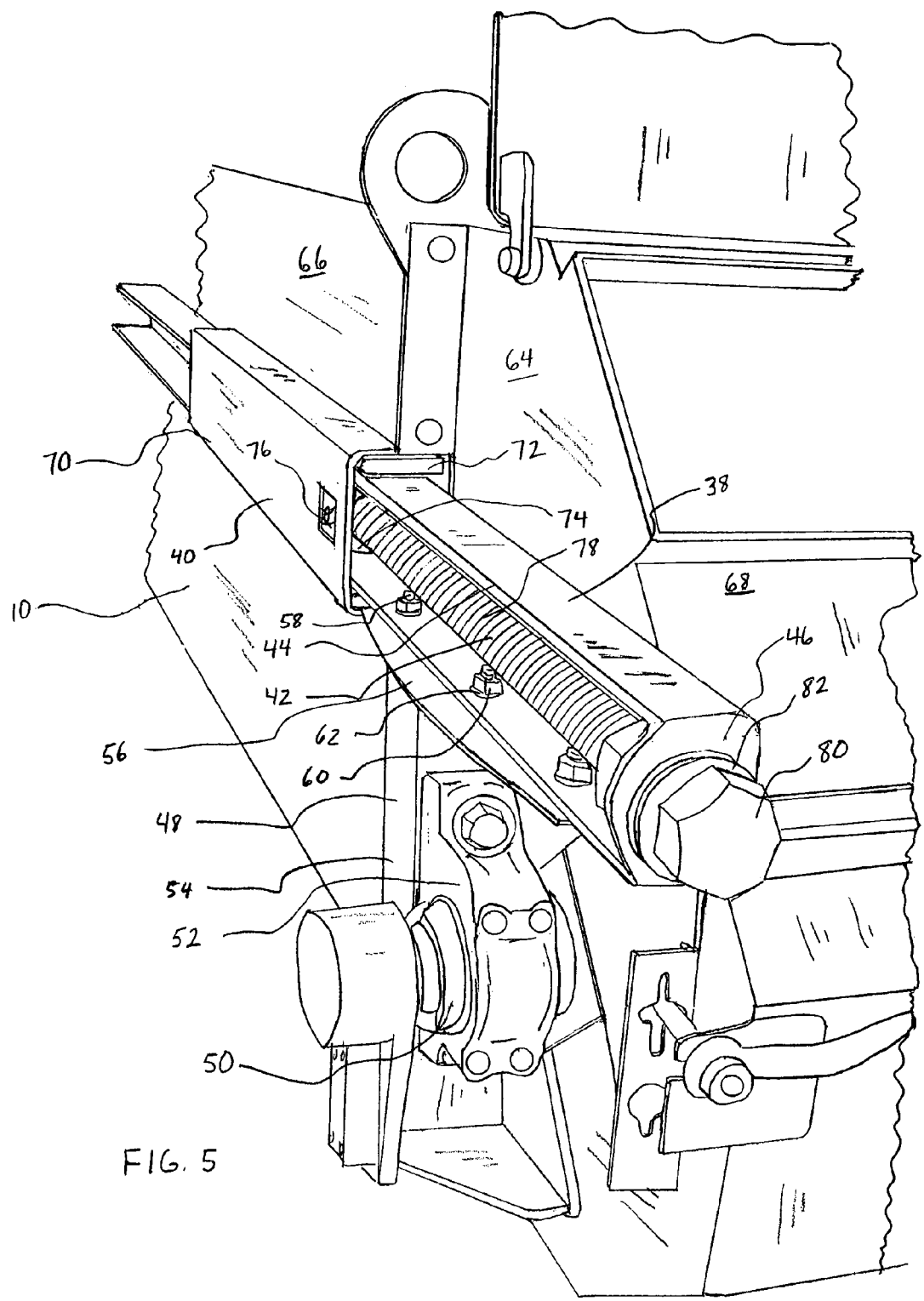
FIG. 5 is a perspective view of a take-up section in accordance with the present invention.

Referring particularly to FIG. 5, support arms 38 include channel 44 having an end partially closed by end plate 46.

Figure 6:
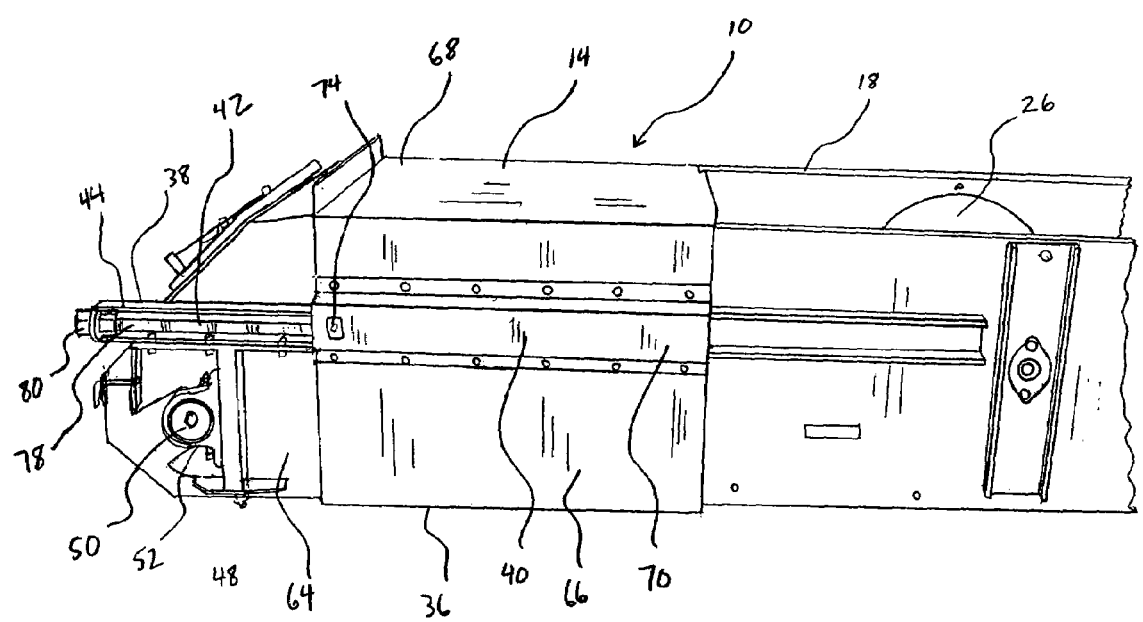
FIG. 6 is a side perspective view of a take-up section in accordance with the present invention.
Figure 7:
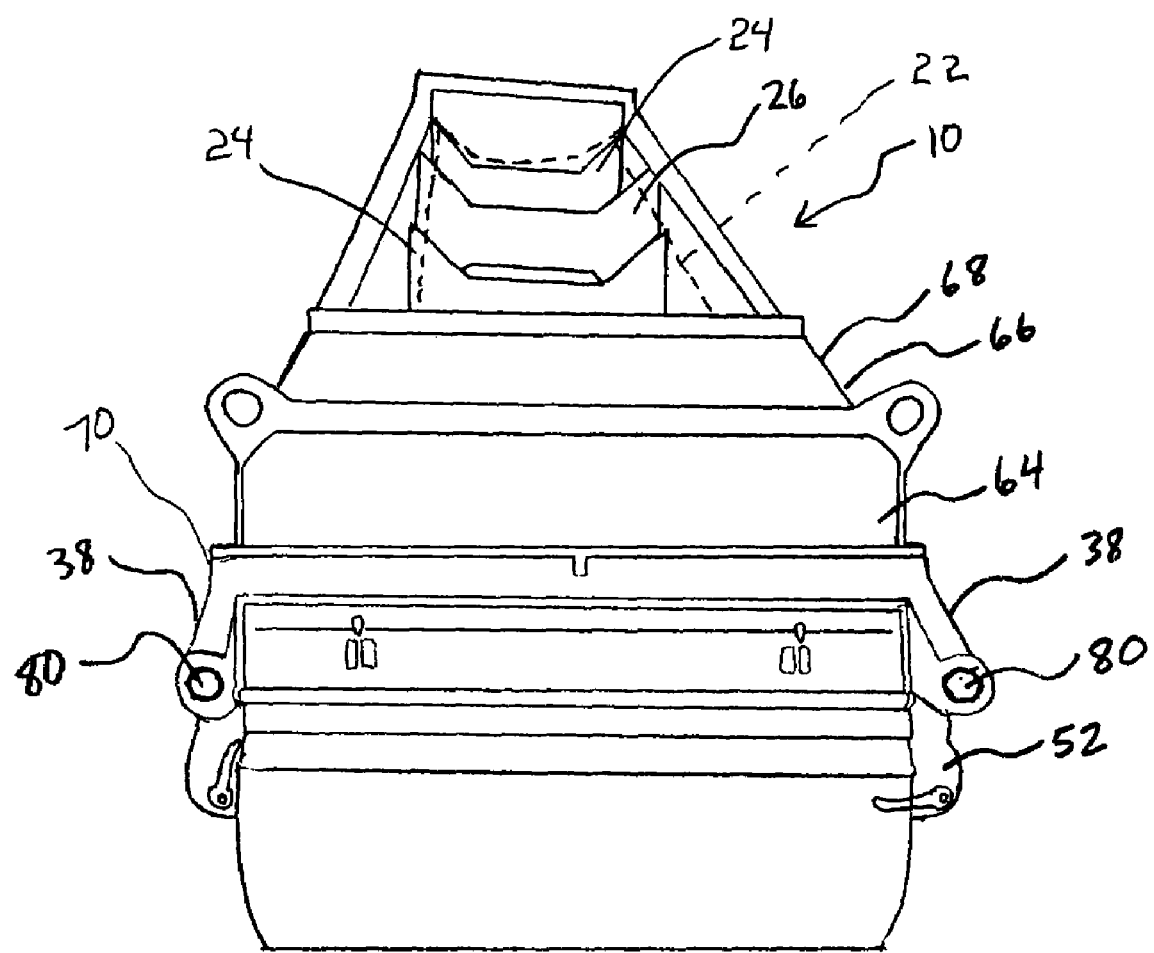
FIG. 7 is an end perspective view of a take-up section in accordance with the present invention.
Figure 8:
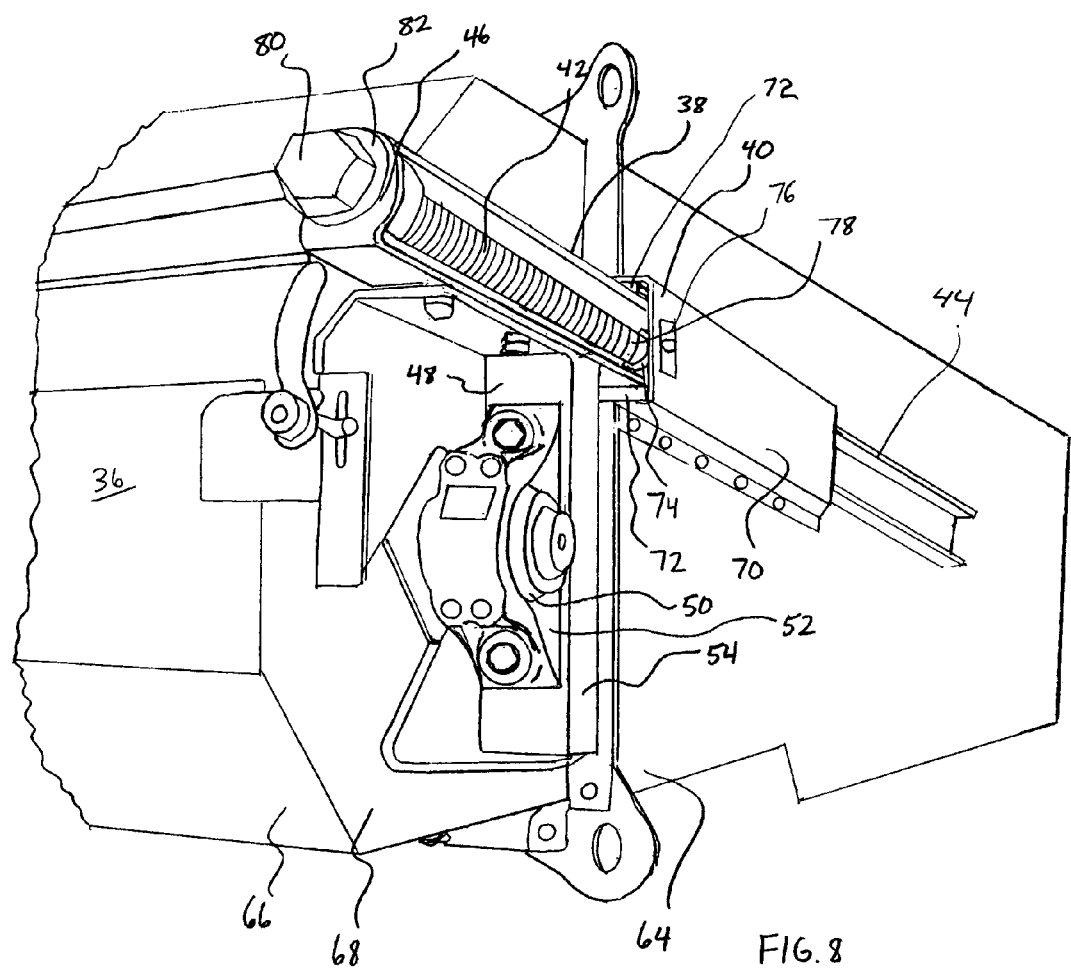
FIG. 8 is a perspective view of a take-up section in accordance with the present invention.

Channel 44 is sized to extend through guide 40 and to be slidingly supported therein. Support arms 38 further include bearing supports 48. Bearing support 48 supports bearings 50. Bearings 50 desirably are in the form of pillow blocks 52. Bearings 50 support either head pulley (not shown) or tail pulley (not shown) depending upon the location of take-up section 36. As depicted in FIGS. 5, 6 and 8, bearing support 48 may include a square tube 54 and flange 56. Flange 56 serves to connect square tube 54 to channel 44 desirably by use of bolts 58, nuts 60 and washers 62.

Take-up section 36 includes inner sleeve 64 and outer sleeve 66. Inner sleeve 64 is integrally formed as a part of housing 68. Housing 68 covers and protects tail section and prevents the loss of conveyed material 31, as depicted here. It is to be understood that take-up section 36 may be installed at head section 12 or tail section 14. This application will describe take-up section 36 as being installed at tail section 14, though it is to be understood that the invention can be practiced at another section of enclosed conveyor 10.

Figure 4A:
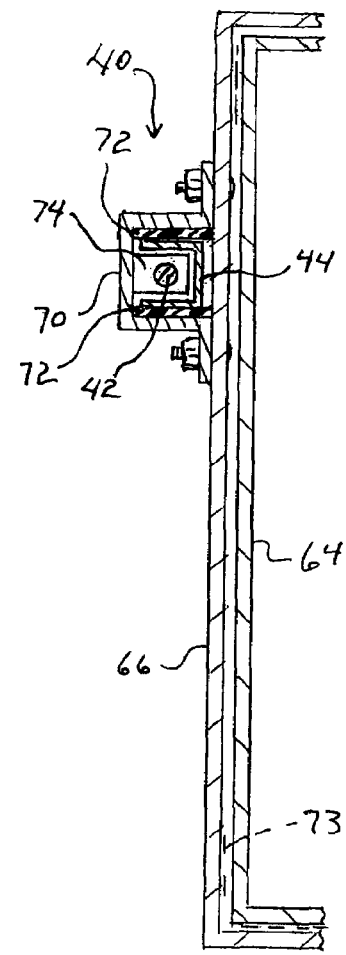
FIG. 4a is a partial cross-sectional view taken at line 4a-4a of FIG. 4.

Referring in particular to FIGS. 4a, 5 and 8, guides 40 are desirably located on the exterior of outer sleeve 66. Guides 40 generally include outer guide sleeve 70, bearing blocks 72 and fixed nut 74. Outer guide sleeve 70 is desirably affixed to the exterior of outer sleeve 66. Outer guides sleeve 70 houses a plurality of bearing blocks 72. Bearing blocks 72 bear against and support channel 44. Desirably bearing blocks 72 are formed of ultra high molecular weight polyethylene but they may be formed from other low friction materials known to those skilled in the art. The dashed lines labeled with the numeral 73 indicate spacers that may be bearings such as polyethelene or dust block material that may extend around the periphery of the inner sleeve of the two telescoping sleeves.

Outer guide sleeve 70 also supports fixed nut 74. Fixed nut 74 is typically affixed to the inside of outer guide sleeve 70 so that take-up screws 42 may be threaded into fixed nut 74. Desirably, fixed nut 74 is formed from brass or other self lubricating material. In addition, it is desirable that fixed nut 74 include zerk fitting 76. Zerk fitting 76 allows fixed nut 74 to be re-lubricated with grease, as needed.

Take-up screws 42 generally include screw shaft 78, hex head 80 and thrust washer 82. Desirably, take-up screws 42 are oversized acme screws plated for rust resistance. Hex head 80 is desirably located to allow for three hundred sixty degree wrench swing for convenience of adjustment. Thrust washer 82 bears against end plate 46 so that when hex head 80 is turned, thrust washer can apply force in either direction against end plate 46 to either extend or retract take-up section 36. Take up screws 42 may be interconnected such as by a sprocket and chain arrangement to allow for simultaneous adjustment. Take up screws 42 are exemplary and can be replaced by a hydraulic extension mechanism, a ratchet mechanism or any other mechanism for extending and retracting known to those skilled in the art.

Desirably the length of channel 44 is roughly two to two and one half times the length of outer guide sleeves 70. This allows for extended adjustment of conveyor belt 22.

Thus, as described herein, support arms 38 carry bearings 50 and thus tail pulley 34, conveyor belt 22 and its associated tension without the load being transferred to housing 68. In this fashion, support arms 38 act as an exoskeleton bearing the load that would otherwise be born by housing 68. Thus, housing 68 can be constructed of much lighter materials than in the prior art. In addition, the interrelationship between outer guide sleeve 70 and channel 44 maintains constant alignment between bearings 50 and the rest of rollers 24. Thus, it is unnecessary to use a separate leveling rod.

In operation, when it becomes necessary to tension conveyor belts 22, an operator simply places a wrench on hex head 80 of take-up screws 42 and turns take-up screws 42 each in equal number of turns to extend take-up section 36 to create a desired belt tension and take-up excess length of the belt created by stretching. In addition, those skilled in the art can readily see that take-up screws 42 could easily be interconnected by a chain and sprocket linkage or another linkage to allow simultaneous adjustment.

The present invention may be embodied in other specific forms without departing from the spirit or essential attributes thereof, and it is, therefore, desired that the present embodiments be considered in all respects as illustrative and not restrictive.

The invention claimed is:

1. An enclosed belt conveyer assembly, comprising:
   a head section;
   a tail section operably connected to the head section;
   the head section or the tail section including an enclosure that telescopically engages an adjacent end of an enclosure section in telescopic relationship, substantially sealing the enclosure to the adjacent end of the enclosure section to substantially prevent the escape of conveyed materials from the enclosed belt conveyer assembly;
   a continuous belt operably interconnecting the head section to the tail section and being supported at the head section by a head pulley on a first axle and being supported at the tail by a tail pulley on a second axle,
   a tensioner connected to both the enclosure and to the enclosure section comprising an elongate exoskeletal sleeve and an elongate member in operable slidable interaction with the sleeve to maintain the enclosure in substantially parallel telescopic relationship and generally parallel to a longitudinal axis of the conveyer assembly and an adjustable extender/retractor operably connected to the sleeve and the member to slidably move the sleeve and the member relative to one another whereby the belt is tensioned and the enclosure is translated; and
   in which the tensioner further comprises an actuator to which a tool is engageable to operate the tensioner by swinging the tool in an arc and in which the actuator is located such that the tool can be swung three hundred sixty degrees without interference with structure of the enclosed belt conveyer assembly.

2. The enclosed belt conveyer assembly as claimed in claim 1, further comprising bearing blocks between the sleeve and the elongate member.

3. The enclosed belt conveyer assembly as claimed in claim 2, in which the bearing blocks comprise ultra high molecular weight polyethylene.

4. The enclosed belt conveyer assembly as claimed in claim 1, wherein the elongate member comprises a channel and the extender/retractor comprises a screw operably connected to the elongate member.

5. The enclosed belt conveyer assembly as claimed in claim 4, wherein the screw is operably connected to the channel via a thrust washer and the screw is threadably operably connected to the sleeve.

6. The enclosed belt conveyer assembly as claimed in claim 1, wherein the elongate member is aligned so that its long axis does not intersect the first axle or the second axle.

7. The method as claimed in claim 1, further comprising the step of interposing a thrust washer between the elongate member and the sleeve.

8. The enclosed belt conveyer assembly as claimed in claim 1, in which the tensioner is disposed exterior to and connected to both the enclosure and to the enclosure section.

9. The enclosed belt conveyer assembly as claimed in claim 1, further comprising a transverse member extending transversely to the elongate member supporting the first axle or the second axle.

10. The enclosed belt conveyer assembly as claimed in claim 1, in which the sleeve is exoskeletal.

11. An enclosed belt conveyer assembly, comprising:
    a head section;
    a tail section operably connected to the head section;
    the head section or the tail section including an enclosure that engages an adjacent end of an enclosure section in telescopic relationship, substantially sealing the first enclosure to the adjacent end of the enclosure section to substantially prevent the escape of conveyed materials from the enclosed belt conveyer assembly;
    a continuous belt operably interconnecting the head section to the tail section and being supported at the head section by a head pulley on a first axle and being supported at the tail section by a tail pulley on a second axle;
    a tensioner connected to both the enclosure and to the enclosure section comprising an elongate sleeve and an elongate member in operable slidable interaction with the sleeve generally parallel to a longitudinal axis of the conveyor assembly and supporting the first axle or the second axle and means for extending and retracting the elongate member operably connected to the sleeve and the member whereby the belt is tensioned and the enclosure is translated; and
    in which the tensioner further comprises an actuator to which a tool is engageable to operate the tensioner by swinging the tool in an arc and in which the actuator is located such that the tool can be swung three hundred sixty degrees without interference with structure of the enclosed belt conveyer assembly.

12. The enclosed belt conveyer assembly as claimed in claim 11, further comprising bearing blocks between the sleeve and the elongate member.

13. The enclosed belt conveyer assembly as claimed in claim 12, in which the bearing blocks comprise ultra high molecular weight polyethylene.

14. The enclosed belt conveyer assembly as claimed in claim 11, wherein the elongate member comprises a channel and the means for extending and retracting comprises a screw operably connected to the elongate member.

15. The enclosed belt conveyer assembly as claimed in claim 14, wherein the screw is operably connected to the channel via a thrust washer and the screw is threadably operably connected to the sleeve.

16. The enclosed belt conveyer assembly as claimed in claim 11, wherein the elongate member is aligned so that its long axis does not intersect the first axle or the second axle.

17. A method of tensioning a belt in an enclosed belt conveyer assembly comprising a head section; a tail section operably connected to the head section; the head section or the tail section including an enclosure that engages an adjacent end of an enclosure section in telescopic relationship, substantially sealing the enclosure to the adjacent end of the enclosure section to substantially prevent the escape of conveyed materials from the enclosed belt conveyer assembly; a continuous belt operably interconnecting the head section to the tail section and being supported at the head section by a head pulley on a first axle and being supported at the tail section by a tail pulley on a second axle; the method comprising the steps of:

operably connecting an elongate sleeve to one of the enclosure or to the enclosure section;

operably connecting an elongate member in operable slidable interaction with the sleeve generally parallel to a longitudinal axis of the conveyor assembly and connected to another of the enclosure or to the enclosure section;

slidably extending or retracting the member relative to the sleeve whereby the belt is tensioned and the enclosure is translated; and in which the step of slidably extending or retracting the member further comprises the step of locating an actuator to which a tool is engageable to operate the tensioner by swinging the tool in an arc such that the tool can be swung three hundred sixty degrees without interference with structure of the enclosed belt conveyer assembly.

18. The method as claimed in claim 17, further comprising the step of inserting bearing blocks between the sleeve and the elongate member.

19. The method as claimed in claim 18, in which the bearing blocks comprise ultra-high molecular weight polyethylene.

20. The method as claimed in claim 17, further comprising the step of interposing a jack mechanism between the member and the sleeve.

21. The method as claimed in claim 17, further comprising the step of interposing a screw between the member and the sleeve and rotating the screw to extend or retract the member relative to the sleeve.

* * * * *